Aug. 20, 1963 W. L. WILCOX 3,101,405
OVERLAY ELECTRODE
Filed July 24, 1961
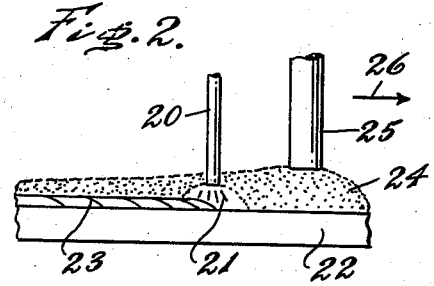
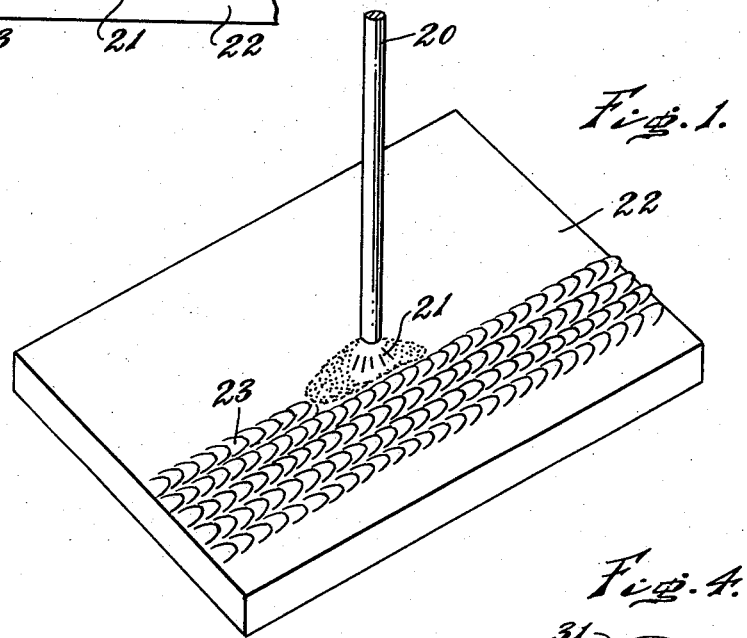
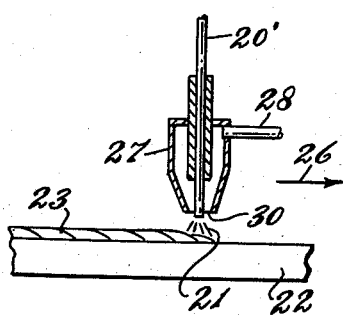
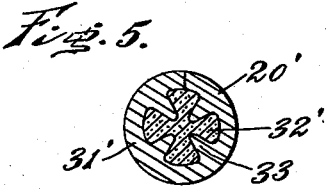
INVENTOR
Wayne L. Wilcox
ATTORNEYS.

United States Patent Office 3,101,405
Patented Aug. 20, 1963

3,101,405
OVERLAY ELECTRODE
Wayne L. Wilcox, Havertown, Pa., assignor to Arcos Corporation, Philadelphia, Pa., a corporation of Pennsylvania
Filed July 24, 1961, Ser. No. 126,015
2 Claims. (Cl. 219—146)

The present invention relates to electric arc welding electrodes for depositing type 316 and 317 stainless steels deposits on steel work.

A purpose of the invention is to simplify the production and reduce the cost of making an electrode which will deposit type 316 or 317 stainless steels on steel work.

A further purpose is to obtain satisfactory overlay welds of type 316 or 317 stainless steel on plain carbon and low alloy steel work.

A further purpose is to avoid difficulty through cracking in type 316 and type 317 stainless steel overlay welding on plain carbon and low alloy steel, especially where the weld metal joins the base metal.

A further purpose is to precisely control the retained ferrite in the overlay by an improved composition of electrode which, with the resulting dilution, will secure a content of retained ferrite which will be adequate but not excessive.

Further purposes appear in the specification and in the claims.

In the drawings I have chosen to illustrate mechanism which will be useful in applying the invention.

FIGURE 1 is a fragmentary diagrammatic perspective of an overlay weld being formed using the electrode of the invention.

FIGURE 2 is a fragmentary diagrammatic vertical section of submerged arc welding according to the invention.

FIGURE 3 is a fragmentary diagrammatic vertical section of welding according to the invention in an atmosphere of protective gas.

FIGURE 4 is a diagrammatic transverse section of one form of welding electrode according to the invention.

FIGURE 5 is a diagrammatic transverse section of another form of welding electrode of the invention.

Describing in illustration but not in limitation and referring to the drawings:

Considerable difficulty has been encountered in obtaining sound overlay welded deposits of type 316 and type 317 stainless steel on plain carbon and low alloy steel base metal for the purpose of producing tanks, retorts, pressure vessels and the like.

It will be remembered that type 316 stainless steel has the following analysis:

| | |
|---|---|
| Carbon | 0.08% maximum. |
| Chromium | 16.00 to 18.00%. |
| Nickel | 10.00 to 14.00%. |
| Molybdenum | 2.00 to 3.00%. |

Type 317 stainless steel has the following analysis listed:

| | |
|---|---|
| Carbon | 0.08% maximum. |
| Chromium | 18.00 to 20.00%. |
| Nickel | 11.00 to 15.00%. |
| Molybdenum | 3.00 to 4.00%. |

The difficulty encountered has been both difficulty in obtaining sound welds which are free from underbead cracking, and also difficulty in holding an analysis in the weld bead of the first pass and the second pass which was within the type 316 or type 317 analysis range.

There is no standard wire composition having the analysis of type 316 or type 317, and if it existed it would be unsuitable to deposit such analysis in view of the dilution of the base metal or work, which is usually mild steel such as AISI 1030 or low alloy steel such as AISI 8620 or 4320, in any case containing less than 3% of total alloy by weight.

Type 310 stainless steel electrodes are not satisfactory as they lay down a bead which is fully austenitic and likely to give a poor result from the standpoint of underbead cracking, and of course do not comply with the desired type 316 or type 317 analysis.

Type 310 Mo is objectionable because there is uncertainty as to whether the bead will be austenitic or not.

Type 312 electrode is undesirable because it gives a deposit which is rather highly ferritic with the resulting disadvantage that the brittle sigma phase may form in the heat affected zones of neighboring weld beads, and also it contains more carbon than is desired and does not product the desired analysis corresponding to type 316 or 317. Accordingly, there is no existing welding electrode which will produce the desired result and solve the problem.

In the new electrode of the invention, the composition has been carefully adjusted so that it will produce the following advantages:

(1) Under the dilution encountered in commercial submerged arc welding or in commercial protected gas atmoshpere welding, the electrode of the invention will reliably produce weld beads in the first and second passes in overlay welding on plain carbon mild steel and low alloy mild steel analyses, which weld beads are within the range of type 316 and type 317 stainless steel.

(2) The ferrite present will be precisely controlled within a limit of 25 to 40% and this will result in controlling underbead cracking of the overlay.

In order to obtain the composition of the invention, a sheath or envelope is used on the electrode which consists of low carbon, plain carbon steel, for example, AISI 1005. Carbonless iron can also be used. The maximum carbon content should not exceed 0.10 percent by weight.

The shell or envelope should make up 24 to 37 percent and preferably 31 percent by weight of the total metallic composition of the electrode.

Inside the shell or envelope is placed a core which in some embodiments of the invention will be entirely an alloying composition, and any other embodiments as later explained may include fluxing ingredients.

The composition of the core by weight based upon the total metallic content of the electrode will be as follows:

| | |
|---|---|
| Ferrochrome, 70% chromium | 41 to 43%, preferably 42%. |
| Nickel | 18 to 24%, preferably 21%. |
| Ferromolybdenum, 60% molybdenum | 4 to 8%, preferably 6%. |
| Electrolytic manganese | 0.5 to 2%, preferably 2%, optional. |

The ingredients of the core will be added suitably as powders, for example through 40 mesh and preferably through 100 mesh per linear inch (Tyler standard mesh).

In case ferrochromium having a different chromium content is used, or in case chromium metal is used, or in case ferromolybdenum having a different molybdenum content is used, or in case metallic molybdenum is used, the percentages will be adjusted accordingly.

The electrode has a maximum nitrogen content of 0.10 percent and preferably of 0.05 percent by weight.

The typical composition of the ferrochromium is as follows:

| | |
|---|---|
| Chromium | 67–72 percent. |
| Carbon | 0.11 percent maximum. |
| Silicon | 1.50 percent maximum. |
| Sulphur | 0.10 percent maximum. |
| Phosphorus | 0.10 percent maximum. |

A typical composition of the ferromolybdenum is as follows:

| | |
|---|---|
| Molybdenum | 55 to 70 percent. |
| Carbon | 0.15 percent maximum. |
| Silicon | 3.00 percent maximum. |
| Iron | Balance. |

A typical composition of the nickel is as follows:

| | |
|---|---|
| Nickel | 98 percent minimum. |
| Sulphur | 0.06 percent maximum. |

The chromium limit is such that when welding on plain carbon or low alloy steel base metal of mild steel carbon range (not exceeding 0.40%) a chromium content within the range of type 316 or 317 stainless steel will be obtained.

The nickel range is such that the proper nickel content is obtained after dilution and a substantial ferrite content is secured in the weld-bead to restrict crack formation.

The molybdenum content is retained in the range which will give, after dilution, helpful corrosion protection and will contribute to controlling ferrite.

The nitrogen is limited to give effective control of ferrite.

In the drawings I illustrate a welding electrode 20 having the composition of the invention which is maintaining an electric arc at 21 to the work 22 which consists of a mild steel plate of plain carbon steel analysis such as AISI 1020, 1030 or 1035, or a low alloy steel analysis such AISI 4130, 8620 or 8420. Overlay weld beads 33 are deposited in succession on the surface of the work having an analysis within the range of type 316 or type 317 stainless steel. The dilution from the plate is of the order of 25 to 40 percent, and the extra alloy composition in the welding electrode compensates for the dilution. Sound weld beads are deposited containing 5 to 15 percent of retained ferrite.

The welding may be conducted using alternating current or direct current of straight or reversed polarity, suitably at 20 to 45 volts and 200 to 900 amperes.

FIGURE 2 illustrates a submerged arc welding setup, submerged arc welding flux 24 being deposited through feed tube 25 which is moving ahead of the electrode in the direction of the arrow 26. The arc 21 in this case is submerged beneath the flux 24. The flux composition will suitably have a maximum, minimum and preferred range as follows:

Zirconium silicate between 50 and 1250 mesh, 5 to 75% by weight preferably 10 to 25% and most desirably about 20%
Lime, 0 to 50%
Limestone, 5 to 15%
Silica, 5 to 10%
Alkali or alkaline earth fluoride, such as fluorspar or cryolite, 2 to 12%.
Ferroalloy such as ferrochromium, ferromanganese or ferrosilicon, 2 to 8%.

The above flux is described in Johnson and Campbell application, Serial No. 708,110, filed January 10, 1958, for Welding With Self Removing Flux, now Patent No. 2,955,193, dated Oct. 4, 1960.

In the case of the submerged arc welding the electrode 20 is suitably a bare wire with alloying ingredients in the core, and the flux is supplied from outside.

The invention is also applicable to exposed arc gas shielded welding as shown in FIGURE 3 where the electrode 20' is fed by suitable feed mechanism to the exposed arc 21 through a welding head 27 which receives a protecting gas through pipe 28. The protecting gas may suitably be carbon dioxide, helium or argon, and is discharged at 30 to protect the arc with inert gas.

The electrode of the invention has a suitable cross-section as shown diagrammatically in FIGURES 4 and 5 consisting of a metallic envelope, the sheath 31 of low carbon, plain carbon steel suitably AISI 1005 and a core 32 as shown in FIGURE 4, the envelope in this case being of uniform cross-section. An envelope 31' may also be used having intruding fins of metal 33 according to Danhier U.S. patent application Serial No. 635,239, filed January 22, 1957, for Automatic Arc Welding Process, Equipment and Electrode, now Patent No. 2,951,931, dated Sept. 6, 1960, the fins extending into the core 32'.

The core 32 or 32' as already explained is composed of alloying ingredients.

In using the exposed arc with gas protection the core will also include flux, and the flux ingredients will include fluxing ingredients to the extent of 24 to 42% of the weight of the metallic shell or envelope. The core flux composition may be entirely slag-forming materials or it may contain dioxidizers in the proportion of 75 to 96% by weight of slag-forming ingredients and 4 to 20% of dioxidizer such as ferromanganese. A specific example is:

Low carbon ferromanganese (containing 80% manganese) 12% by weight
Slag-forming mixture 88% by weight The slag-forming materials of the core are composed of 60 to 85% by weight of titanium oxide, 4 to 20% by weight of manganese monoxide, 8 to 25% by weight of silica, the balance consisting mainly of ferrous oxide, alumina, lime, magnesia and alkalies.

Having thus described my invention what I claim as new and desire to secure by Letters Patent is:

1. An electric arc welding electrode for overlay deposition of type 316 or 317 stainless steel containing 0.08% carbon maximum on plain carbon or low alloy steel, which consists of an envelope of low carbon plain carbon steel making up from 24 to 37 percent of the total metallic content of the electrode and a core of powdered metal within the envelope making up the following proportions of the total metallic content of the electrode:

| | Percent |
|---|---|
| Ferrochrome, 70% chromium | 41 to 43 |
| Nickel | 18 to 24 |
| Ferromolybdenum, 60% molybdenum | 4 to 8 | the electrode having a nitrogen content of 0.10 maximum.

2. An electrode of claim 1, in which the envelope is 31 percent of the total metallic content of the electrode and the core is 42 percent of ferrochromium, 21 percent of nickel and 6 percent of ferromolybdenum, of the metallic content of the electrode.

References Cited in the file of this patent

UNITED STATES PATENTS

| | | |
|---|---|---|
| 1,358,311 | Harris | Nov. 9, 1920 |
| 2,219,462 | Wissler | Oct. 29, 1940 |
| 2,408,620 | Friedlander | Oct. 1, 1946 |

FOREIGN PATENTS

| | | |
|---|---|---|
| 501,998 | Italy | Nov. 26, 1946 |